United States Patent
Lipsit (10) Patent No.: US 6,748,209 B2
(45) Date of Patent: *Jun. 8, 2004

(54) METHOD AND APPARATUS FOR STORING ACTIVATION DATA IN A CELLULAR TELEPHONE

(75) Inventor: James Mason Lipsit, Lake Worth, FL (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,613

(22) Filed: Aug. 9, 2001

(65) Prior Publication Data

US 2002/0032023 A1 Mar. 14, 2002

Related U.S. Application Data

(63) Continuation of application No. 09/219,872, filed on Dec. 24, 1998, which is a continuation of application No. 08/901,827, filed on Jul. 28, 1997, now Pat. No. 5,974,311, which is a continuation of application No. 08/550,274, filed on Oct. 30, 1995, now abandoned.

(51) Int. Cl.[7] .......................... H04M 3/16; H04M 3/00; H04M 1/00
(52) U.S. Cl. ...................... 455/411; 455/418; 455/419; 455/550.1
(58) Field of Search ................................ 455/419, 411, 455/418, 450, 186.1, 550, 410

(56) References Cited

U.S. PATENT DOCUMENTS

| | | | |
|---|---|---|---|
| 3,764,915 | A | 10/1973 | Cox et al. |
| 4,525,865 | A | 6/1985 | Mears |
| 4,864,599 | A | 9/1989 | Saegusa et al. |
| 4,951,308 | A | 8/1990 | Bishop et al. |

(List continued on next page.)

FOREIGN PATENT DOCUMENTS

| | | |
|---|---|---|
| EP | 9210658.2 | 11/1992 |
| GB | 2 249 459 A | 5/1992 |
| GB | 2 249 923 A | 5/1992 |
| WO | PCT/US94/05289 | 6/1995 |

OTHER PUBLICATIONS

"BCC's Revolutionary New Device Simplifies Cellular Phone Programming," Cellular Today, Aug. 7, 1995.

"Shifting Cellular Distribution Patterns: A Call for Change," C–TAC Cellular Telephone Activation Center, ORA Electronics, 1994.

Lurie Silberg, "ORA System to Speed Cellular Activation," HFD, Apr. 11, 1994, p. 148.

Primary Examiner—William Cumming
(74) Attorney, Agent, or Firm—Kenyon & Kenyon (57) ABSTRACT

A method and apparatus for programming a cellular telephone with activation parameters. A cellular telephone to be programmed is connected to a computer via communications interface. A user input device is provided to allow a user to provide programming information, including a cellular telephone type, to the computer. A visual representation of the cellular telephone type is displayed on a display monitor o allow the user to interactively verify the inputted programming information. Upon such user verification, the computer determines activation parameters and transmits the activation parameter to the cellular telephone. In accordance with another aspect of the invention, certain activation parameters are dynamically computed based on the user provided programming information. In one embodiment, the user enters a cellular telephone number to be assigned to the cellular telephone. The computer looks up a system identification associated with the cellular telephone number in memory unit. Certain activation parameters are dynamically computer based on the cellular telephone number and system identification.

29 Claims, 4 Drawing Sheets

U.S. PATENT DOCUMENTS

| | | | | |
|---|---|---|---|---|
| 5,031,204 A | | 7/1991 | McKernan | |
| 5,046,082 A | | 9/1991 | Zicker et al. | |
| 5,086,513 A | * | 2/1992 | Lawrence et al. | 455/186.1 |
| 5,109,403 A | | 4/1992 | Sutphin | |
| 5,155,860 A | | 10/1992 | McClure | |
| 5,220,593 A | | 6/1993 | Zicker et al. | |
| 5,249,218 A | | 9/1993 | Sainton | |
| 5,276,729 A | | 1/1994 | Higuchi et al. | |
| 5,297,191 A | | 3/1994 | Gerszberg | |
| 5,297,192 A | | 3/1994 | Gerszberg | |
| 5,301,223 A | * | 4/1994 | Amadon et al. | |
| 5,315,638 A | | 5/1994 | Mukari | |
| 5,325,418 A | * | 6/1994 | McGregor et al. | |
| 5,349,697 A | | 9/1994 | Pelkonen | |
| 5,367,563 A | | 11/1994 | Sainton | |
| 5,381,346 A | | 1/1995 | Monahan-Mitchell et al. | |
| 5,386,455 A | | 1/1995 | Cooper | |
| 5,400,389 A | | 3/1995 | Niiyama et al. | |
| 5,414,751 A | | 5/1995 | Yamada | |
| 5,414,753 A | | 5/1995 | Ehara | |
| 5,418,837 A | | 5/1995 | Johansson et al. | |
| 5,465,288 A | * | 11/1995 | Falvey et al. | 455/418 |
| 5,485,505 A | * | 1/1996 | Norman et al. | |
| 5,487,108 A | | 1/1996 | Atkins et al. | |
| 5,491,740 A | * | 2/1996 | Ellis et al. | |
| 5,495,518 A | | 2/1996 | Hayashi | |
| 5,500,888 A | * | 3/1996 | Chiu et al. | |
| 5,530,745 A | | 6/1996 | Urasaka et al. | |
| 5,555,286 A | | 9/1996 | Tendler | |
| 5,566,226 A | | 10/1996 | Mizoguchi et al. | |
| 5,568,536 A | * | 10/1996 | Tiller et al. | |
| 5,572,571 A | | 11/1996 | Shirai | |
| 5,577,100 A | | 11/1996 | McGregor et al. | |
| 5,583,933 A | | 12/1996 | Mark | |
| 5,588,042 A | | 12/1996 | Comer | |
| 5,590,373 A | | 12/1996 | Whitley et al. | |
| 5,592,535 A | | 1/1997 | Klotz | |
| 5,603,084 A | * | 2/1997 | Henry, Jr. et al. | 455/186.1 |
| 5,606,597 A | * | 2/1997 | Newland | 379/355 |
| 5,610,973 A | | 3/1997 | Comer | |
| 5,625,669 A | * | 4/1997 | McGregor et al. | |
| 5,628,055 A | | 5/1997 | Stein | |
| 5,631,947 A | * | 5/1997 | Wittstein et al. | |
| 5,657,371 A | | 8/1997 | Suomi et al. | |
| 5,673,306 A | * | 9/1997 | Amadon et al. | |
| 5,684,861 A | | 11/1997 | Lewis et al. | |
| 5,722,084 A | * | 2/1998 | Chakrin et al. | 455/551 |
| 5,761,618 A | * | 6/1998 | Lynch et al. | 455/419 |
| 5,812,953 A | * | 9/1998 | Griffith et al. | 455/550 |
| 5,854,978 A | * | 12/1998 | Heidari | 455/403 |
| 5,887,249 A | * | 3/1999 | Schmid | 455/411 |
| 5,887,254 A | * | 3/1999 | Halonen | 455/419 |
| 5,974,311 A | * | 10/1999 | Lipsit | 455/418 |
| 6,026,293 A | * | 2/2000 | Osborn | 455/411 |
| 6,178,324 B1 | * | 1/2001 | Choquet et al. | 455/422 |
| 6,178,336 B1 | * | 1/2001 | Crozat | 455/558 |
| 6,195,546 B1 | * | 2/2001 | Leung et al. | 455/419 |
| 6,243,574 B1 | * | 6/2001 | McGregger et al. | 455/418 |
| 2002/0032023 A1 | * | 3/2002 | Lipsit | 455/419 |

* cited by examiner

| AREA CODE + PREFIX | SYSTEM ID | LOCATION |
|---|---|---|
| (407)-346 | 00037 | WEST PALM BEACH FL |
| (407)-353 | 00175 | ORLANDO FL |
| (407)-371 | 00037 | WEST PALM BEACH FL |
| (407)-373 | 00037 | WEST PALM BEACH FL |
| (407)-374 | 00037 | BOYNTON BEACH FL |
| (407)-379 | 00037 | WEST PALM BEACH FL |
| (407)-399 | 00175 | ORLANDO FL |
| (407)-421 | 00175 | ORLANDO FL |

METHOD AND APPARATUS FOR STORING ACTIVATION DATA IN A CELLULAR TELEPHONE

The present application is a continuation of U.S. patent application Ser. No. 09/219,872, filed Dec. 24, 1998 (now U.S. Pat. No. 6,650,893), which is a continuation of U.S. patent application Ser. No. 08/901,827, filed Jul. 28, 1997 (now U.S. Pat. No. 5,974,311), which is a continuation of U.S. patent application Ser. No. 08/550,274, filed Oct. 30, 1995 (abandoned).

FIELD OF THE INVENTION

The present invention relates generally to the programming of cellular telephones. More particularly, the present invention relates to the automated programming of a cellular telephone.

BACKGROUND OF THE INVENTION

Cellular telephones are becoming increasingly popular. In the past, the sale of cellular telephones was limited to specialized cellular telephone dealers. Today, due to the increased popularity of cellular telephones, such telephones may be purchased from a variety of retailers, including electronic specialty stores, electronic chain stores, department stores, and cellular service provider retail outlets. Upon the purchase of a cellular telephone, the telephone must be activated before it can be used with a particular cellular service provider in a geographic location. Such activation generally requires the programming (i.e. storing) of activation parameters into the memory of the cellular telephone.

The cellular telephone memory which stores the activation parameters is called a Number Assignment Module (NAM), and the data which is stored in the NAM is called NAM parameters. Such NAM parameters include the telephone number associated with the cellular telephone and an identification of the cellular service provider which will provide the cellular telephone service associated with that telephone. There are other NAM parameters which must be programmed in order to activate the telephone. These parameters will be discussed in more detail below in the detailed description.

The programming of NAM parameters is a time consuming and error prone process. Each manufacturer's telephone(s) has different programming requirements and procedures. As a result, point-of-sale personnel must have access to large amounts of programming reference material for each of the different types of phones. The actual programming is generally done through the cellular telephone keypad. The first step in the programming is to enter a programming code into the keypad which will instruct the telephone to enter a programming mode. Once in the programming mode, each of the NAM parameters is entered through the keypad. Such keypad programming is prone to errors and a small mistake in programming renders the phone unusable until correctly programmed.

The complexity of NAM parameter programming has made the sale of cellular telephones less profitable for retail stores which do not specialize in such sales, because point of sale personnel must be trained to program the cellular telephones. In addition to the training expense, such sales personnel must dedicate a substantial amount of time in programming the phones, time which could be otherwise spent with customers in the sale of new phones. In addition, programming by inexperienced sales personnel often results in an incorrectly programmed telephone. In many instances, such incorrect programming is not discovered until the customer has left the store and has attempted to use the telephone. As a result, the customer must return to the store to have the phone reprogrammed. This results in both more time required by sales personnel, and reduced customer satisfaction.

U.S. Pat. No. 5,386,455 entitled System and Method for Automatic Activation of Cellular Telephones discloses a system for programming NAM parameters in a cellular telephone. In accordance with the technique described therein, a local computer is connected to both a cellular telephone and an authorizing computer of a selected cellular carrier. User information, such as credit information, is manually entered into the local computer. The local computer interrogates the cellular telephone to determine certain data stored in the cellular telephone. The user information and cellular telephone data is sent to the authorizing computer of the selected cellular carrier via a modem. Upon approval by the local carrier, the authorizing computer sends to the local computer the data required for programming the cellular telephone. Upon receipt of the data, the local computer programs the cellular telephone with the received data. Thus, in accordance with this technique, the activation data to be stored in the cellular telephone is not stored or computed locally in the local computer, but is stored at a remote authorizing computer, and the data must be transferred from the remote authorizing computer to the local computer prior to programming the cellular telephone. In addition, there is no disclosure of user interaction with the programming function apart from the entering of user information.

UK Patent Application GB 2256113-A, entitled "Programming A Cellular Radio Telephone" also discloses a system and method for programming activation data into a cellular telephone. The system includes a remote computer which is coupled to an acoustic converting device (e.g. an acoustic coupler) thus providing communication between the cellular telephone and the remote computer. The preferred embodiment shows the link between the computer and the acoustic converting device being a network (i.e. telephone network). In operation, the computer ascertains the type, serial number, and other basic data from the telephone, and using this data, selects the appropriate set-up data for the telephone from a stored table. The data is then sent to the mobile telephone via the link and the acoustic converting device. There is no interactive communication between a user and the remote computer which controls the programming.

SUMMARY OF THE INVENTION

In accordance with the present invention, a method and apparatus for storing activation parameters in a cellular telephone is provided. A cellular telephone to be programmed is connected to a local computer. The computer includes a user input device which allows a user to input programming information, including the cellular telephone type, to the computer. Upon the receipt of the user programming information, a visual representation of the user inputted cellular telephone type is displayed on a display screen to allow the user to interactively verify the inputted programming information. Upon user verification of the programming information, the computer determines appropriate activation parameters based on the inputted programming information, and transmits the activation parameters to the telephone for storage in the cellular telephone memory.

In accordance with another aspect of the invention, certain activation parameters are neither stored in the computer memory, nor are they supplied by the user, but instead they are computed dynamically by the computer based on the user inputted programming information. In one embodiment, the user inputted programming information includes a cellular telephone number to be assigned to the telephone. The computer retrieves from memory a stored system identification which is associated with the area code and prefix of the user inputted cellular telephone number. Certain activation parameters are dynamically computed based on the cellular telephone number and the system identification.

Thus, in accordance with the present invention, a method and apparatus for programming a cellular telephone is provided with a level of user interaction which provides advantages over the prior systems. The user may interactively verify inputted programming information prior to an attempt to store activation parameters in the cellular telephone. In addition, computer memory requirements are reduced by dynamically computing certain activation parameters, thus saving the memory space which otherwise would be taken up by stored activation parameters. These advantages are provided in a method and apparatus which may be implemented on a computer system which is local to the cellular telephone programming location.

These and other advantages of the invention will be apparent to those of ordinary skill in the art by reference to the following detailed description and the accompanying drawings.

DETAILED DESCRIPTION

Figure 1:
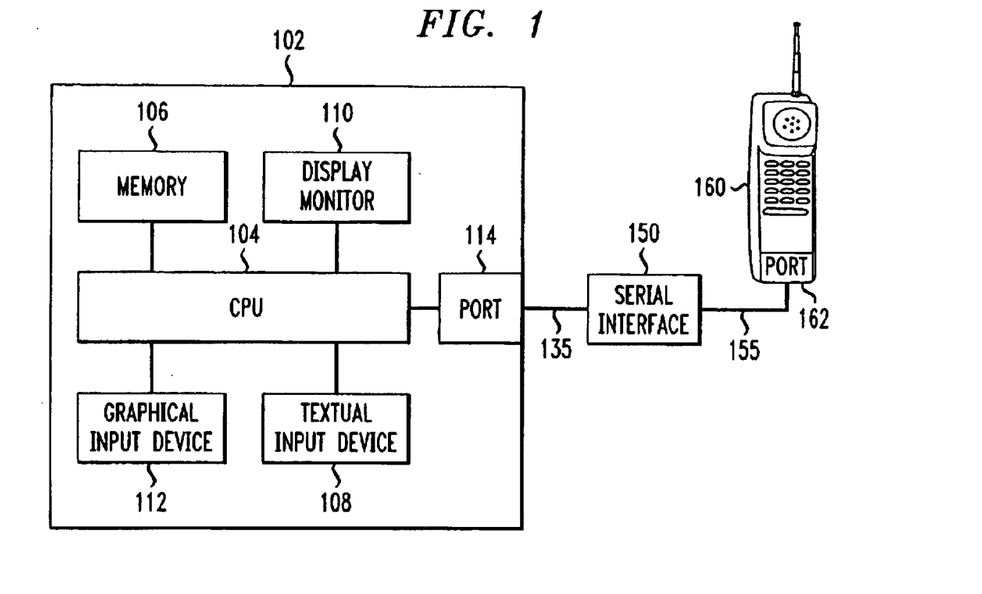
FIG. 1 shows a block diagram of an apparatus for programming a cellular telephone in accordance with the present invention.

FIG. 1 shows a block diagram of an apparatus for programming a cellular telephone in accordance with the present invention. Computer 102 is shown, which in an advantageous embodiment is a personal computer of the type which is well known in the art. The overall functioning of the computer 102 is controlled by a central processing unit (CPU) 104 executing computer program instructions. CPU 104 is connected to a memory unit 106 which contains the computer program instructions which are executed by the CPU 104. In addition, memory unit may contain data, other than computer program instructions, which is accessed by CPU 104 during execution of the program instructions. Memory unit 106 may be any type of machine readable storage device. For example, memory unit 106 may be a random access memory (RAM), a read only memory (ROM), a programmable read only memory (PROM), an erasable programmable read only memory (EPROM), an electronically erasable programmable read only memory (EEPROM), a magnetic storage media (i.e. a magnetic disk), or an optical storage media (i.e. a CD-ROM). Further, the computer 102 may contain various combinations of machine readable storage devices, which are accessible by the CPU 104, and which are capable of storing a combination of computer program code and data. CPU 104 is also connected to a textual input device 108, such as a keyboard, and a graphical input device 112, such as a mouse. Such user input and output devices are well known in the art and will not be discussed in further detail herein. CPU 102 is also connected to a display monitor 110, which displays information to a user. In addition, CPU 104 is connected to a data I/O port 114 which allows the computer 102 to communicate with external devices. In accordance with an advantageous embodiment, the data I/O port 114 is a serial data port.

The computer 102 is connected to a serial interface 150 via a cable 135 which connects the serial port 114 of the computer 102 to the serial interface 150. The serial interface 150 is connected to a data interface port 162 of a cellular telephone 160, via cable 155. Cellular telephone 160 is of the type which contains a microprocessor which controls the functioning of the cellular telephone 160. The data interface port 162 allows the microprocessor of the cellular telephone 160 to communicate with external devices. Thus, cable 135, serial interface 150, and cable 155 allow the computer 102 to communicate with the cellular telephone 160. The cellular telephone 160 may be one of a variety of telephones sold by various manufacturers. For example, cellular telephones which may be programmed by the present invention are made by, Motorola, Nokia, AT&T, Ericsson, Oki, and others. Each of these telephones may require a somewhat different interface in order to connect the serial port 114 of the computer 120 to the data interface port 162 of the cellular telephone 160. As a result, the details for the cable 135, serial interface 150, and cable 155 will vary depending on the type of cellular telephone 160 being programmed. The appropriate connecting cables, interfaces, and adapters are available from the cellular telephone manufacturers, and will not be described in further detail herein.

It is noted that if the computer 120 has a single serial port 114, then the interface hardware for connecting to the cellular telephone 160 may need to be swapped when different types of cellular telephones are to be programmed. If computer 120 has multiple serial ports, then the different interface hardware required for different telephone types may be connected to the multiple serial ports. In this configuration, the CPU under control of the computer program instructions may select the appropriate serial port to be active based on the cellular telephone type entered by the user. Various interface configurations may be implemented by one skilled in the art.

The cellular telephone 160 is of the type which contains a Number Assignment Module (NAM) which stores data required for the operation of the cellular telephone 160 under control of the telephone's microprocessor. As described above, a cellular telephone must be activated prior to use. Such activation requires the storing of certain parameters in the NAM. The most common NAM parameters, along with exemplary data, are shown below in Table 1.

TABLE I

| DESCRIPTION | DATA |
| --- | --- |
| PHONE NUMBER (MIN) | 407-346-1111 |
| SYSTEM IDENTIFICATION (SID) | 00037 |
| ACCESS OVERLOAD CLASS | 01 |
| GROUP ID MARK | 10 |
| INITIAL PAGING CHANNEL | 333 |
| SECONDARY PAGING CHANNEL | 708 |

TABLE I-continued

| DESCRIPTION | DATA |
| --- | --- |
| WAKE UP MESSAGE | AT&T WIRELESS SERVICES |
| LOCK CODE | 1111 |

The phone number (i.e. MIN), is the telephone number which is to be associated with the cellular telephone 106. In accordance with convention practices, a cellular service provider will be supplied with a plurality of telephone numbers from the local telephone company in a particular geographic location. These telephone numbers are then assigned to various cellular telephones, such as cellular telephone 160, when the telephone is purchased. In the present example, assume that the cellular service provider was assigned the telephone number 407-346-1111, and that this is the telephone number which is to be assigned to the cellular telephone 160.

The second NAM parameter is the system identification (i.e. SID). The system identification identifies the cellular service provider which will provide cellular service to the cellular telephone 160. Since there may be more than one cellular service provider in a given geographic location, this parameter identifies the system with which the cellular telephone 160 will communicate. In accordance with one aspect of the invention, a system identification data table is stored in memory 160 and is used to determine the appropriate system identification to be assigned to the telephone 160. This determination is based upon the telephone number assigned to the telephone 160.

Figure 2:
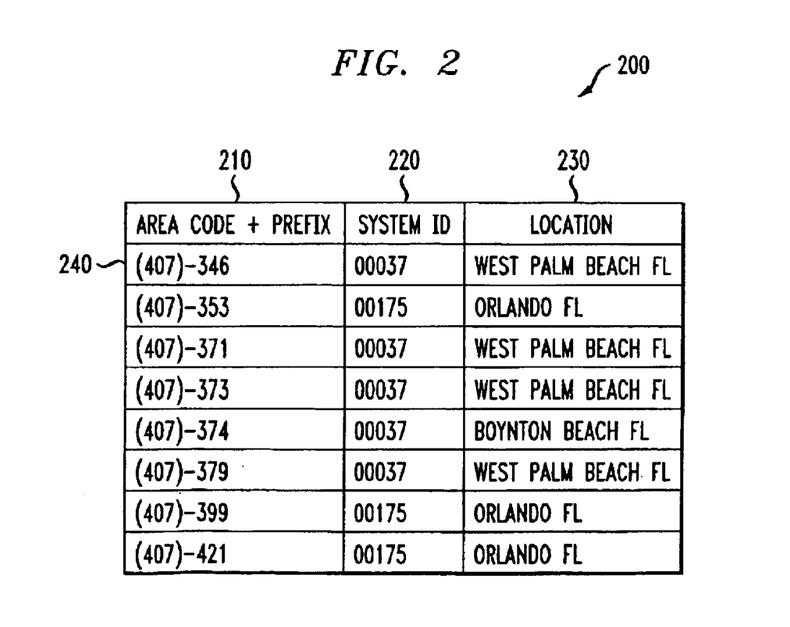
FIG. 2 shows an example of a system identification data table.

An exemplary system identification data table 200 is shown in FIG. 2. The table 200 associates a system identification 220 and location 230 with a given area code + prefix combination 210. Thus, given an assigned telephone number, the system can determine the appropriate system ID. In the presently described embodiment, all telephones to be programmed are to use the same cellular service provider, and therefore, only one system ID 220 is required for each area code + prefix pair 210. In this embodiment, the system IDs 220 are those that are assigned to the single cellular service provider in each of the locations 230 shown in FIG. 2.

Figure 3A:
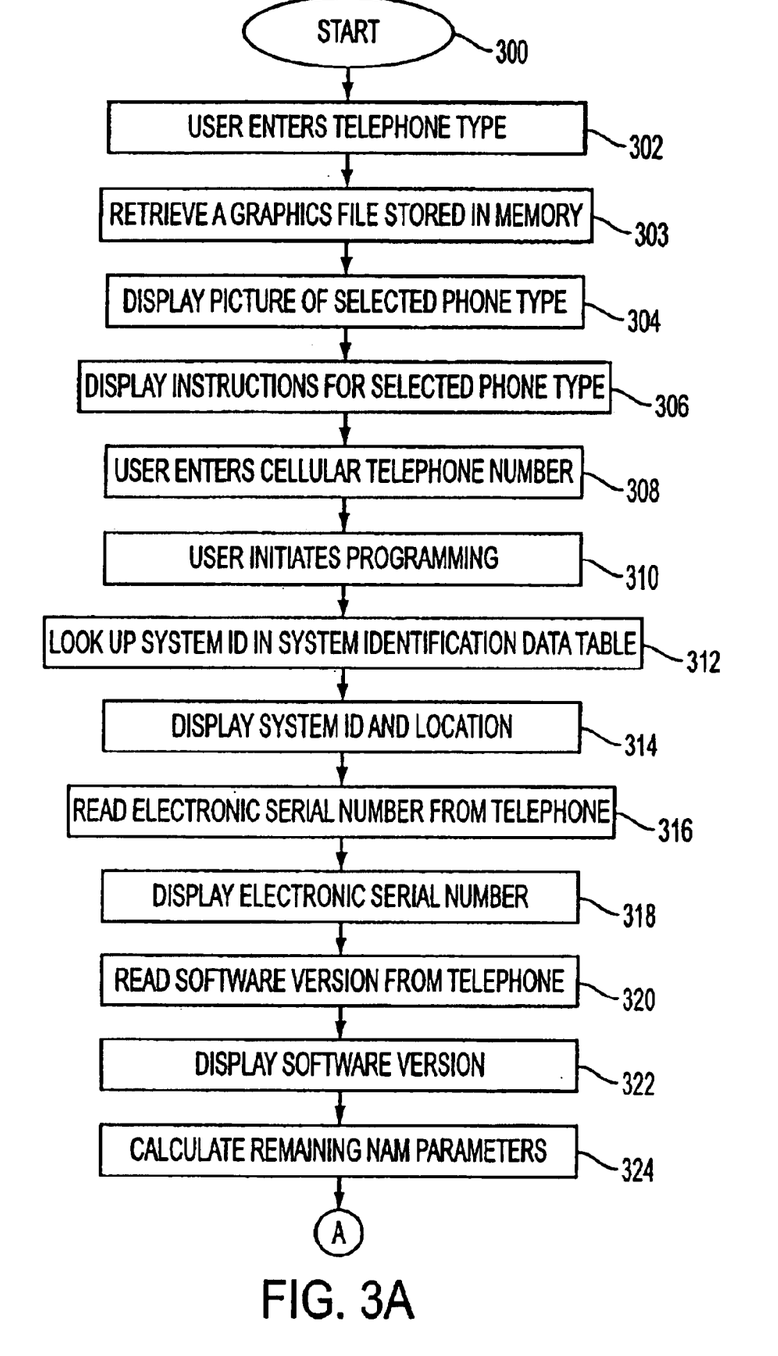
FIGS. 3A and 3B show a flowchart of the steps for programming a cellular telephone in accordance with the present invention.
Figure 3B:
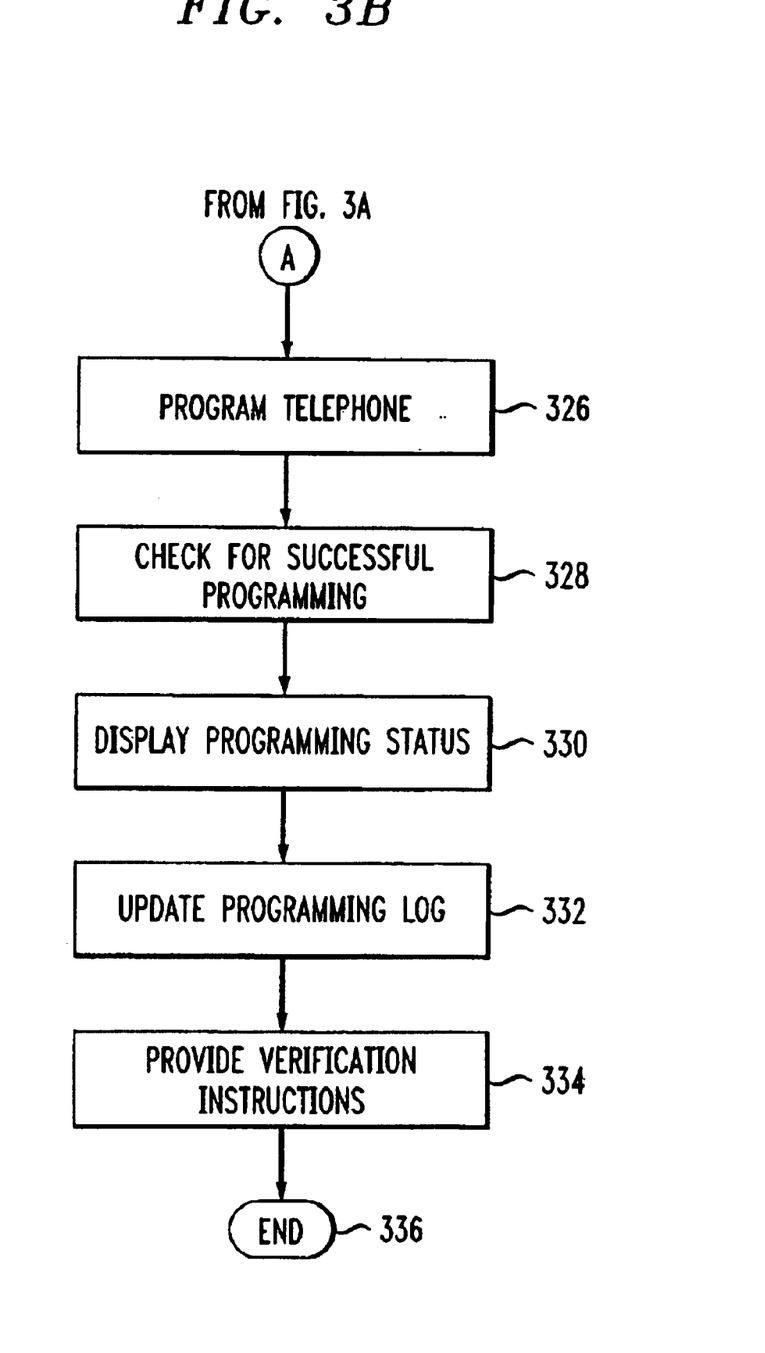
Figure 4:
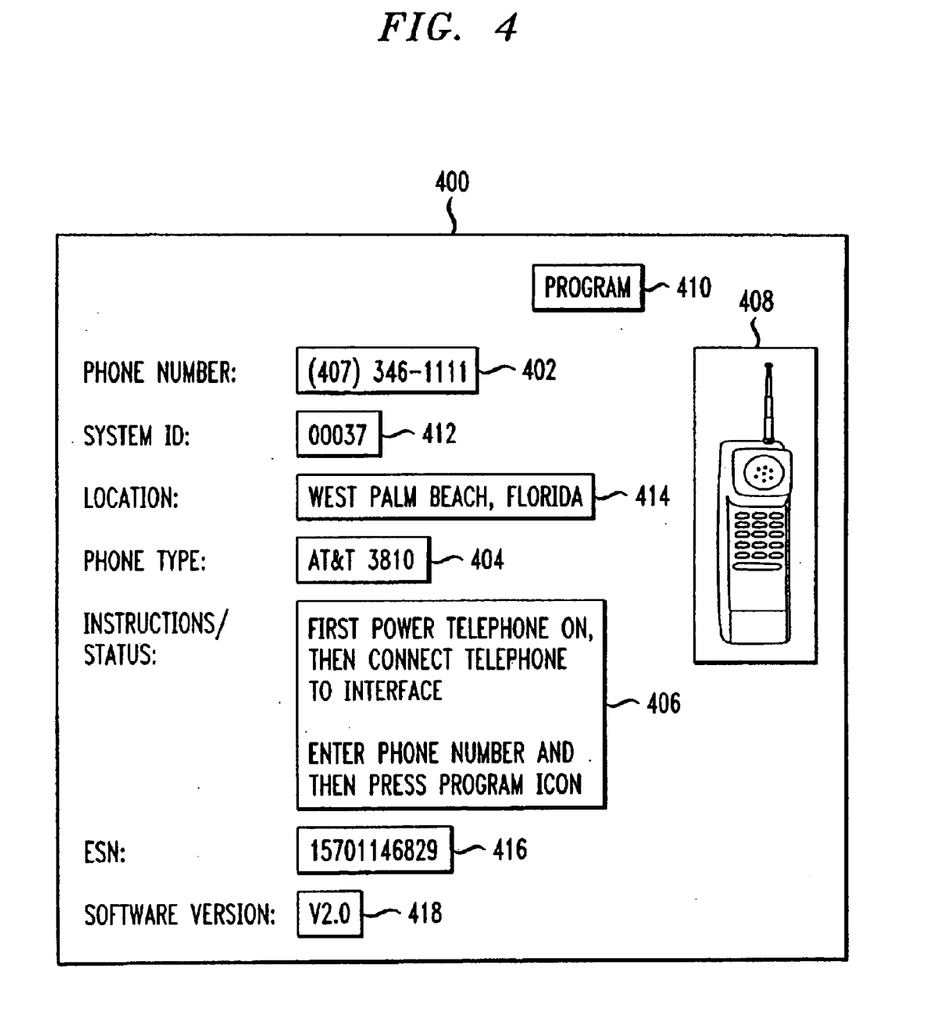
FIG. 4 illustrates an example user interface which is displayed to a user in accordance with the present invention.

As described above, the computer 102 operates according to stored computer program instructions (i.e. control program) to carry out the functions of the present invention. A flowchart of the steps to be carried out by the computer 102 as defined by the control program is shown in FIGS. 3A and 3B. An example of the user interface 400 which is presented to the user on display monitor 110 is shown in FIG. 4.

The program is initiated in step 300. In step 302 the cellular telephone type is requested from the user. The cellular telephone type identifies the manufacturer of the telephone, and the particular model of the telephone. As shown in FIG. 4, the user enters the telephone type in area 404 of the user interface using the graphical input device 112 and/or the textual input device 108. The user may be provided with a menu of telephone types from which one type may be chosen using the graphical input device 112, or the user may enter a telephone type using the textual input device 114. Such various means for receiving user input from a user interface are well known in the art and will not be described further herein. Assume for the purposes of this example, that the user has entered "AT&T 3810" in area 404 to indicate the type of cellular telephone 160 being programmed. In step 304 a picture of the telephone selected by the user in step 306 is displayed in area 408 of the user interface 400. A set of telephone image files which represent graphical images of the different telephone types which may be programmed with the system are stored in the memory 106. When the user selects a telephone type in step 306 the appropriate graphics file is accessed and the image of the selected telephone is presented to the user. In one embodiment, these graphics files are stored as bitmap (.BMP) files, in a manner which is well known in the art of computer graphics.

At this point, the user can verify that an image of the cellular telephone 160 which is to be programmed is displayed in area 408 of the use interface 400. If the image in area 408 does not match that of the cellular telephone 160 to be programmed, the user may re-enter the phone type in area 404 of the display screen 104. In response, the system will display an image of the newly entered telephone type. Thus, the display of an image of the telephone type provides a verification mechanism so that the user can verify that the telephone type entered in step 302 corresponds to the cellular telephone 160 which is to be programmed. Such verification takes place prior to any attempt to store data in the NAM of the cellular telephone 160. In accordance with the interactive verification feature of the invention, the display monitor 110 is located proximate to the input devices 108 and 112, such that the user may verify the input by viewing the information displayed on the display monitor 110.

In step 306, instructions for the selected telephone type are displayed in area 406 of the user interface 400. As shown in FIG. 4, these instructions set forth the next steps to be taken by the user in order to program the cellular telephone. In step 308, the user enters the cellular telephone number in area 402 of the user interface 400. As described above, a cellular provider is supplied with a plurality of telephone numbers from a local telephone company. In the embodiment described herein, the list of such phone numbers is external to the computer, and the phone number to be assigned to the cellular telephone is chosen from the external list and is provided to the computer as user input. In an alternate embodiment, the list of phone numbers is stored in the memory of the computer and the particular telephone number to be assigned to the cellular telephone is chosen from the stored list. In such an embodiment, a user may enter an area code and prefix combination, and an appropriate telephone number having such an area code and prefix combination would be selected and used to program the telephone.

In step 310, the user initiates the programming of the cellular telephone 160 by pointing and clicking on a program icon 410 using the graphical input device 112. Thus, the programming of the cellular telephone is only initiated upon an action by the user after the user has verified the user supplied input data. In an alternate embodiment, the user could be provided with an abort icon to stop the programming of the cellular telephone. In such an embodiment, the programming of the telephone would occur unless the user aborts the programming. In this embodiment, the user verifies the input data by not clicking on the abort icon.

In step 312, the system identification is looked up in the system identification table 200 (FIG. 2). The area code +prefix combination entered by the user in area 402 is (407)346. This corresponds with entry 240 in the system identification table 200, which indicates that the system ID is 00037, and that the location is West Palm Beach, Fla. In step 314, the system ID and location are displayed in areas 412 and 414 respectively, in the user interface 400. In step 316 the electronic serial number (ESN) is read from the telephone. The ESN is displayed in area 416 of the user interface 400 in step 318. In step 320 the software version of the telephone firmware is read from the telephone. The software version is displayed in area 418 of tie user interface 400 in step 322. The steps of reading and displaying the software version of the cellular telephone firmware is useful in the event that a more recent version of the software has been released. The control program could check for such an occurrence and provide the user with a message to the effect that a software upgrade may be appropriate. It is noted that steps 316 through 322 are optional and provide additional information to the user. One skilled in the art would recognize that other optional information could also be provided to the user.

In step 324 the remaining NAM parameters are calculated. Certain remaining NAM parameters are computed according to NAM parameter derivation rules, as described below. Certain other NAM parameters are predetermined and may be hard-coded into the control program or otherwise stored in memory. It is noted that the below described NAM parameters are well known to those skilled in the art of cellular telephone systems. As such, only a brief description of each of the parameters will be given here. The access overload class controls the telephone's access to the cellular system when the system is overloaded, and is generally derived as 0+the last digit of the MIN. Thus, in the present example, the access overload class is "01". The Group Id Mark can be used to define groupings of cellular systems. Generally, the Group Id Mark is set to 10. The Initial Paging Channel is the primary dedicated control channel. Control channels may vary depending on the cellular service provider. Thus, the control channel is computed based upon the system identification parameter. In the present embodiment, the Initial Paging Channel is set to 333 if the system identification is odd, and to 334 if the system identification is even. In the present example, the Initial Paging Channel is 333. The Secondary Paging Channel is the secondary dedicated control channel. In the present embodiment, the Secondary Paging Channel is set to 708 if the system identification is odd, and to 737 if the system identification is even. In the present example, the Secondary Paging Channel is 708. The Wake Up Message is the message which appears on the telephone when the telephone is powered on. In the present example, the Wake Up Message is "AT&T WIRELESS SERVICES". The Lock Code is a code which enables or disables use of the telephone, and is generally derived as the last 3 or 4 digits of the MIN. In the present example, the Lock Code is the last 4 digits of the MIN. Thus, the Lock Code is set to 1111.

It is noted that the telephone number (MIN) is the only NAM parameter which is supplied by the user, and that the system identification (SID) is the only NAM parameter which is stored in the system identification data table 200. The Group Id Mark and the Wake Up Message are predetermined and are hard-coded into the control program or otherwise stored in memory. The remaining NAM parameters are computed dynamically as described above based on the MIN and SID. Thus, the dynamically generated parameters are not stored in memory. They are derived from the MIN and SID in step 324 using the above described NAM parameter derivation rules. It is noted that the NAM parameter derivation rules may vary depending on particular embodiments of the invention. The ability to dynamically compute certain NAM parameters reduces the amount of information which must be stored in the computer memory.

In step 326, the NAM of cellular telephone 160 is programmed under control of the computer 102. By sending the appropriate signals to the cellular telephone 160 via the serial interface 150 and cables 135 and 155, the computer 102 first instructs the cellular telephone 160 to enter its programming mode. Then, the computer 120 sends the appropriate NAM parameters to the cellular telephone 160. Each manufacturer's telephone may require different programming procedures, and such procedures are carried out by the computer under control of the control program depending on the type of cellular telephone being programmed. One technique for programming the telephone is for the computer 102 to send signals corresponding to keypad presses to the cellular telephone 160. Using this technique, the cellular telephone 160 is programmed in a manner similar to the manner in which a person would program the telephone using the keypad. The computer 102 sends a sequence of signals, corresponding to a sequence of keypad presses, to program the telephone. Programming in this manner is faster and more accurate than a person using the keypad to program the telephone.

Some types of telephones accept special instructions when the telephone is being programmed through an external interface. In these types of phones, the computer 102 sends special programming codes, along with programming data, to the cellular telephone 160, and the microprocessor in the cellular telephone interprets the codes and data and stores appropriate parameters in the NAM of the cellular telephone. Thus, the particular mechanism for programming the telephone may vary with different telephone types.

In step 328 the computer determines if the programming was successful. In the present embodiment, this is accomplished by determining if a valid ESN was read from the telephone in step 316. If the ESN which was read from telephone is valid, then it is assumed that programming was successful. In step 330, the status (i.e. successful or unsuccessful) of the programming is displayed on the user interface 400 at location 406. If the programming was unsuccessful, the user may review the user interface 400 to determine where the problem may be, and may attempt to reprogram the telephone.

In step 332 a programming log is updated. A programming-log is a file which is stored in memory 106 which records programming events. An example log entry for the example discussed above is as follows:

| | |
|---|---|
| Quantity in series: | 1 |
| Mobile Number: | (407) 346-1111 |
| ESN: | 15701146829 |
| Model: | AT&T 3810 |
| Version: | Dec. 22, 1994 |
| System ID: | 00037 |
| System ID Market Name: | West Palm Beach, Florida |
| Software Version: | v2.0 |
| Location Identification: | ABC Electronics |
| Date: | Sep. 21, 1995 |
| Time: | 8:52:26 AM |

Each entry in the log describes a programming event. Most of the entries have been described above, and will not be described again here. The "Quantity in series" entry identifies the sequential number of this entry in the programming log. The "Version" identifies the software version of the telephone. The "Software Version" identifies the software version of the control program. The "Location Identification" identifies the location at which the programming was carried out. The "Date" and "Time" identify the date and time of the programming. The system may provide users with the capability of archiving, editing, viewing, querying, and deleting log entries. Such file management techniques are well known, and could be readily implemented by one skilled in the art.

In step 334, verification instructions are displayed in the user interface in area 406. The verification instructions provide the user with instructions on how to verify that the correct telephone number, as well as other parameters, has been programmed into the cellular telephone. Most telephones have a code which may be entered on the keypad which will display the cellular telephone number, or other programmed parameters, on the telephone display screen. These codes are displayed to the user so that the programming may be verified by the user. In this way, the programming personnel can verify the NAM parameters without the need to remember, or look up, the verification codes for the particular telephone being programmed.

Other instructions, in addition to verification instructions, may also be provided to the user in area 406 of user interface 400. For example, the system may provide the user with instruction on how to system select the A(non-wireline) or B(wireline) side as the primary system for the telephone. This is useful when the telephone will be operating in areas in which there is more than one cellular service provider, or if the telephone will be operating in different areas with different cellular service providers. The program ends in step 336.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for programming a cellular telephone comprising:
   receiving a first input identifying a select one of a plurality of cellular telephone types to which the cellular telephone belongs;
   retrieving a graphics file based on the first input identifying the select one of a plurality of cellular telephone types, wherein the graphics file represents a physical image of a particular cellular telephone type; and
   displaying the retrieved graphics file that represents the physical image of the cellular telephone type to allow user verification of the first input.

2. The method of claim 1, further comprises:
   retrieving an activation parameter from a memory unit based on a second input; and
   transferring the retrieved activation parameter to the cellular telephone via a serial communications interface.

3. The method of claim 2, wherein the second input comprises a mobile identification number assigned to the cellular telephone, the method further comprises:
   storing a system identification data table in a memory unit, the data table including a portion of each of a plurality of mobile identification numbers and a system identifier corresponding with each portion; and
   wherein retrieving the activation parameter comprises:
      retrieving, based on a portion of the mobile identification number assigned to the cellular telephone, the corresponding system identifier from the system identification table.

4. The method of claim 3, wherein transferring the retrieved activation parameter comprises:
   transferring the corresponding system identifier to the cellular telephone via the serial communications interface.

5. The method of claim 2, wherein the second input includes an area code and a prefix, the method further comprises:
   presenting a user with a list including a plurality of mobile identification numbers, wherein each of the plurality of mobile identification numbers includes the area code and prefix included in the second input.

6. The method of claim 5, further comprises:
   retrieving the list, from an remote external source, based on the area code and the prefix included in the second input.

7. The method of claim 5, further comprises:
   retrieving the list, from the memory unit, based on the area code and the prefix included in the second input.

8. The method of claim 5, further comprises:
   receiving a selected mobile identification number from the plurality of mobile identification numbers included in the list; and
   programming the cellular telephone using the selected mobile identification number.

9. The method of claim 1, further comprises:
   reading a software version of a software included in the cellular telephone;
   comparing the software version with a current software version available for the cellular telephone type; and
   notifying a user of the current software version available via the display.

10. The method of claim 1, further comprising:
    dynamically generating a first activation parameter based on a second input; and
    transferring the dynamically generated first activation parameter to the cellular telephone via a serial communications interface.

11. The method of claim 10, wherein the first activation parameter is an access overload class and the second input is a portion of a mobile identification number of the cellular telephone.

12. The method of claim 10, wherein the first activation parameter is a lock code and the second input is a portion of a mobile identification number of the cellular telephone.

13. The method of claim 10, wherein the first activation parameter is a paging channel and the second input is a system identifier.

14. An apparatus comprising:
    a processing unit;
    a memory unit coupled to the processing unit, the memory unit to store a plurality of graphics files, wherein each graphics file represents a physical image of a particular cellular telephone type;
    a serial communications interface to connect a cellular telephone to the processing unit;
    an input device coupled to the processing unit, wherein the input device to receive a first input identifying a select one of a plurality of cellular telephone types to which the cellular telephone belongs; and
    a display unit connected to the processing unit and located proximate to the input device, wherein the processing unit to retrieve a graphics file from the memory unit based on the first input identifying the select one of the plurality of cellular telephone types and the display unit to display the retrieved graphics file that represents the physical image of the cellular telephone type to allow user verification of the first input.

15. The apparatus of claim 14, the processing unit to retrieve an activation parameter from the memory unit based on a second input and transfer the retrieved activation parameter to the cellular telephone via the serial communications interface.

16. The apparatus of claim 15, the memory unit to store a system identification data table including a portion of each of a plurality of mobile identification numbers and a system identifier corresponding with each portion and the processing unit to retrieve the system identifier corresponding to a portion of the mobile identification number for the cellular telephone from the system identification table stored in the memory unit.

17. The apparatus of claim 14, the processing unit to read a software version of a software included in the cellular telephone via the interface and to compare the software version with a current software version available for the cellular telephone type, and the display to notify a user of the current software version available.

18. A machine-readable medium having stored thereon a program to be executed by a processor to implement a method for programming a cellular telephone, the method comprising:

receiving a first input identifying a select one of a plurality of cellular telephone types to which the cellular telephone belongs, wherein the graphics file represents a physical image of a particular cellular telephone type;

retrieving a graphics file based on the first input identifying the select one of the plurality of cellular telephone types; and displaying the retrieved graphics file that represents the physical image of the cellular telephone type to allow user verification of the first input.

19. The machine-readable medium of claim 18, the method further comprising:

retrieving an activation parameter from the memory unit based on a second input; and transferring the retrieved activation parameter to the cellular telephone via a serial communications interface.

20. The machine-readable medium of claim 19, the method further comprising:

receiving a selected mobile identification number from the plurality of mobile identification numbers included in a list; and programming the cellular telephone using the selected mobile identification number.

21. A machine-readable medium having stored thereon a program to be executed by a processor to implement a method for programming a cellular telephone, the method comprising:

receiving a user input including a cellular telephone type identifying a select one of a plurality of manufacturing types to which the cellular telephone belongs;

displaying an image of the identified cellular telephone type on a display screen to allow user verification of the user input;

retrieving at least one activation parameter from a memory based on the user input; and transferring the at least one activation parameter to the cellular telephone type via a data port.

22. The machine-readable medium of claim 21, the method further comprising:

dynamically generating at least one activation parameter; and transferring the at least one dynamically generated activation parameter to the cellular telephone.

23. The machine-readable medium of claim 22, the method further comprising:

transferring a cellular telephone number included in the user input to the cellular telephone.

24. The machine-readable medium of claim 21, the method further comprising:

displaying on the display screen instructions for verifying the stored activation parameters in the cellular telephone.

25. A method for programming a cellular telephone comprising:

receiving a first input identifying a select one of a plurality of cellular telephone types to which the cellular telephone belongs;

retrieving a graphic file from a memory unit based on the first input identifying the select one of the plurality of cellular telephone types, wherein the graphics file represents a physical image of a particular telephone type; and displaying the retrieved graphics file that represents the physical image of the cellular telephone type to allow user verification of the first input.

26. The method of claim 25, further comprises:

retrieving an activation parameter from the memory unit based on a second input; and transferring the retrieved activation parameter to the cellular telephone via a serial communications interface.

27. The method of claim 26, wherein the second input comprises a mobile identification number assigned to the cellular telephone, the method further comprises:

storing a system identification data table in the memory unit, the data table including a portion of each of a plurality of mobile identification numbers and a system identifier corresponding with each portion; and wherein retrieving the activation parameter comprises:
retrieving, based on a portion of the mobile identification number assigned to the cellular telephone, the corresponding system identifier from the system identification table.

28. The method of claim 27, wherein transferring the retrieved activation parameter comprises:

transferring the corresponding system identifier to the cellular telephone via the serial communications interface.

29. The method of claim 27, wherein the second input includes an area code and a prefix, the method further comprises:

presenting a user with a list including a plurality of mobile identification numbers, wherein each of the plurality of mobile identification numbers includes the area code and prefix included in the second input.

* * * * *